United States Patent Office 3,657,451
Patented Apr. 18, 1972

3,657,451
ORGANO-TIN MITICIDES AND METHOD OF USING THE SAME
Charles A. Horne, Jr., Modesto, Calif., assignor to Shell Oil Company, New York, N.Y.
No Drawing. Continuation-in-part of application Ser. No. 25,302, Apr. 2, 1970. This application Feb. 8, 1971, Ser. No. 113,715
Int. Cl. A01n 9/00
U.S. Cl. 424—288
9 Claims

ABSTRACT OF THE DISCLOSURE

A method of killing or controlling mites by contacting them with an organo-tin compound of the formula

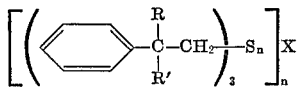

wherein R is a hydrocarbon group, R' is H or R, X is an electro-negative group and $n$ is 1 or 2.

This application is a continuation-in-part of Ser. No. 25,302, filed Apr. 2, 1970 and now abandoned.

BACKGROUND OF THE INVENTION

This invention is drawn to a method of controlling and killing mites. More particularly, this invention relates to a method of controlling and killing mites by means of a selective organo-tin compound having the formula

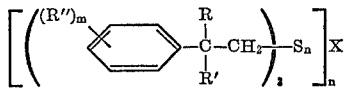

wherein R is lower alkyl, R' and R'' are each hydrogen or lower alkyl, $m$ is an integer from 0 to 2, $n$ is an integer of 1 or 2 and X is a member selected from the group consisting of halogen,

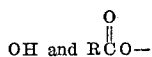

OH and RCO— when $n$ is 1 and —O— when $n$ is 2. By lower alkyl is meant $C_1$ to $C_4$ alkyl which includes both straight and branched chains, i.e., methyl, ethyl, propyl, isopropyl, butyl, isobutyl, sec-butyl.

It is well known, especially to the farmer, that millions of dollars worth of damage is done each year to agricultural crops and especially to fruit trees by mites. Various miticides used to control these pests have proven to be unsuccessful over a period of time due to the mites becoming "resistant" to the miticide. This problem is very ably demonstrated in Farm Chemicals, vol. 132, No. 9, September 1969, pp. 50–68. As noted by the above article, this problem is particularly true of the various chlorinated hydrocarbon and organophosphate miticides. It is therefore evident that new classes of miticides are essential in order to meet the rising demand for the control of these farm pests. In U.S. Pat. 3,264,177, tri-cyclohexyl derivatives of tetravalent tin are stated to be active miticides. Apparently this activity was limited to the tricyclohexyl derivatives as there are no known teachings in the art that other organo-tin compounds possess miticidal activity, even though many organo-tin compounds are known.

It has now been discovered that organo-tin compounds having the above formula possess selective activity as miticides.

The unique miticidal properties of the present invention are apparently related to the alkyl substitution on the carbon atom adjacent to the phenyl ring. It is also essential that there be a two-carbon bridge between the tin atom and the phenyl ring. In other words, there are at least two points of criticality necessary for the compounds utilized in this invention to show specific activity as miticides. Compounds not containing the ethylene bridge, for example the benzyl group or a 3-phenylpropyl group, do not show exceptional miticidal activity as will be subsequently demonstrated. Moreover, the phenethyl group containing no substitution on the carbon atom adjacent to the phenyl ring does not show sufficient activity to be a useful miticide.

In the preferred class of compounds R is methyl, R' is hydrogen or methyl, $m$ is 0, $n$ is 1 or 2 and X is halogen, O or OH. Especially preferred are the compounds wherein both R and R' are methyl, $m$ is 0, $n$ is 1 or 2, and X is Cl, O or OH. The β,β-dimethyl phenethyl group is referred to in the art as the "neophyl" group and will hereinafter be referred to as such.

As is generally true with metal oxides and hydroxides, the compounds wherein X is O or OH are interconvertible and presumably exist in equilibrium, i.e.,

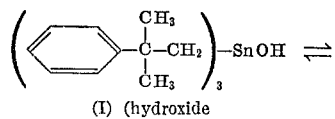

(I) (hydroxide)

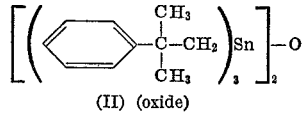

(II) (oxide)

In the presence of aqueous media the equilibrium between I and II lies in the favor of I, whereas in non-aqueous media the equilibrium lies in the favor of II. For purposes used herein the designation of either I or II separately may be considered to be either that compound per se or mixtures of I and II in equilibrium. The miticidal activity of the hydroxide form, the oxide form or mixtures in equilibrium are considered to be comparable although there may be some variances.

Most of the organo-tin compounds useful in the present invention are disclosed in the prior art as are the methods of making them. Various neophyl tin compounds are disclosed in Organic Chemistry, vol. 5, No. 1, January 1966, pp. 87–91. Other neophyl and related compounds, i.e. the 2-phenylpropyl compounds are disclosed in the Journal of Organic Chemistry, vol. 31, 1966, pp. 3857–3860. The process for making these compounds is also disclosed.

The compounds utilized in this invention are particularly useful in combatting mites which inhabit the vairous fruit trees throughout the United States and particularly the McDaniel mites which are prevalent in the Western United States and the European red mites, which inhabit the Eastern seaboard of the United States. Other prevalent mites controlled by the invention are 2-spotted spider mites and rust mites. A distinct advantage of the present method is that, while showing some activity, it is less effective against typhlodromus mites than other mites. The typhlodromus mites are predacious mites which prey upon the plant-eating mites and do not harm the plant itself. It is therefore desirable by application of a miticide to reduce the population of the plant-eating mites as much as possible without destroying the predacious mites.

The compounds utilized in the present invention also exhibit a relatively low degree of toxicity toward beneficial insects, such as honey bees and lady bird beetles, as compared to the tricyclohexyl tin derivative. Moreover, the compounds used in the present invention exhibit a lower degree of mammalian toxicity than do the tricyclohexyl tin derivatives and are less objectionable to warm-blooded animals when consuming foodstuffs which have been in contact with these tin compounds.

The compositions of the present invention may be made up in either concentrated or dilute form for ease in handling and shipping. In order to reduce shipping costs, the compositions are initially made up in a concentrated phase and then are diluted with an additional carrier just prior to application. In preparing the compositions of the invention the tin compound is mixed or combined with one or more of the conventional pesticidal additives or adjuvants including organic solvents, water, or other liquid carriers, surface active agents, or particulate and finely-divided solids.

In the preparation of solid or finely-divided solid compositions, the tin compound is mixed with any of the commonly used finely-divided agricultural carriers such as Fuller's earth, bentonite, diatomaceous earth, kaolin, talc, chalk, and the like. In preparing such compositions, the finely-divided carried is mixed with the miticide or the two may be first mixed together and then run through a series of milling operations to reduce the size of the particles. The particle reduction may be carried out either with the dry materials or by first mixing the toxicant and/or carrier in a liquid. These dust compositions can be employed as concentrates and then subsequently mixed with additional carrier to obtain the desired amount of toxicant in a composition to be employed for the control of mites.

If desired, solid compositions can be mixed with a surface-active or dispersing agent to form a wettable powder. Such powders are easily dispersible in a liquid carrier to form sprays or solutions. Suitable surface acting or dispersing agents include ionic or non-ionic emulsifying or dispersing agents such as high alkyl alkoxy sulfonates, polyoxyethylene sorbitans, alkyl phenoxy polyethoxy ethanols and lignosulfonates. These wettable powders containing the toxicant and surface-active agent may be diluted for use in a solvent such as water or water-oil mixtures.

The compositions of this invention may also be made up as emulsifiable concentrates or water-dispersible liquids. In so doing, the tin compound may be mixed with suitable water-immiscible organic solvent and a surface-active agent to produce the emulsifiable concentrate. This concentrate may exist either as a water-in-oil concentrate or an oil-in-water concentrate having a thick mayonnaise-like consistency. When ready for application, such concentrates are further diluted with water to form spray mixtures having the toxicant homogeneously suspended throughout. Representative dispersing agents which may be utilized in the compositions of the present invention are alkylphenoxy polyethoxy ethanols and lignosulfonates. These surface-active or dispersing agents are usually employed in the concentrate in amounts varying from about 0.5 to about 10% by wt. of the concentrate.

In making up the compositions, whether they be in the form of a dry mixture or an emulsifiable concentrate, the amount of toxicant in said compositions will usually range from about 1 to about 80% by wt. basis total composition. Other ingredients may also be incorporated into the compositions such as other pesticides.

In carrying out the method of the present invention, the mites are killed or controlled by contacting them with a miticidally effective dosage of the appropriate tin compound. While it is within the scope of the present invention to contact the pest with the unformulated tin compound, it is most desirable to contact the pest with a formulated material. The formulated material will comprise the compositions previously mentioned which have been diluted for application. The exact concentration of the tin products in the diluted composition to be applied will depend upon the toxicity of the tin compound as well as the method of application. Therefore, the actual weight of the active toxicant in the composition will vary depending upon the susceptibility of the pest to the compound. The compounds have demonstrated residual activity in that they are known to be active over a period of days or weeks, so that a mite coming into contact with a substrate containing the pesticide such as plants, soil or buildings will be destroyed or killed. In general, when utilizing dusts, the mites may be killed or controlled with compositions containing from about 1 to about 5% by weight of the toxicant in the composition. When applying the toxicant in the form of a spray or liquid, effective dosages are usually obtained with liquid compositions containing from about 0.015 to about 0.06% by weight of the toxicant. The compositions utilized in this invention are relatively non-phytotoxic to plants when applied within the preferred range.

If desired, the compositions of the present invention may be utilized with other active toxicants such as insecticides, herbicides, etc.

In order to more fully demonstrate the invention the following examples are given.

EXAMPLE 1

Fifty-two parts by weight of technical trineophyl tin chloride (95% purity) were blended with 3 parts by weight of sodium-lauryl-sulfate (Duponol ME), 3 parts by weight of an ionic desugared sodium lignin sulfonate (Marasperse N-22) and 42 parts by weight of finely-divided continental clay. These ingredients were blended together, hammer-milled, air-milled and afterblended to form a 50% wettable powder concentrate.

Similarly, 55.6 parts by weight of a technical trineophyl tin hydroxide-trineophyl tin oxide mixture were blended with 3 parts of sodium-lauryl-sulfate, 3 parts of a sodium lignin sulfonate and 38.4 parts of continental clay. Milling and blending produced a concentrate in the form of 50% wettable powder.

EXAMPLE 2

The toxicity index (TI) of various organo-tin compounds against the 2-spotted spider mite was determined using parathion as a standard. The $LC_{50}$ of the various organo-tin compounds was determined and the TI's were calculated as follows:

$$TI = \frac{LC_{50} \text{ (test compound)}}{LC_{50} \text{ (parathion)}} \times 100$$

In other words any compounds having a TI of under 100 were not as active as parathion and those having a TI above 100 were more active. The results are reported in Table I.

TABLE I

[Toxicity index for 2-spotted spider mite $(R''')_3SnX$]

| R'' | Cl | F | OH* | $-O\overset{O}{\underset{\|}{C}}CH_3$ | Br |
|---|---|---|---|---|---|
|  | 66 | 94 | 0 | | |
| —CH$_2$— | 7 | 0 | 0 | | |
| —CH$_2$CH$_2$— | 61 | 50 | 63 | | |
| 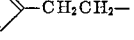—CH(CH$_3$)—CH$_2$— | 177 | 130 | 152 | | |
| 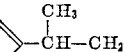—C(CH$_3$)$_2$—CH$_2$— | 750 | 515 | 620 | 430 | 480 |
| 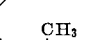—CH$_2$CH$_2$CH$_2$— | 22 | 0 | 11 | | |
| 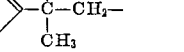—CH$_2$CH$_2$CH$_2$CH$_2$— | 21 | | 14 | | |
| CH$_3$——C(CH$_3$)$_2$—CH$_2$— | 99 | | 104 | | |

*May also be in the oxide form $(R''')_3SnOSn(R''')_3$ or in equilibrium between the —OH and oxide forms.

It is evident from the above table that only those compounds containing either the neophyl or the 2-phenylpropyl structure show exceptional miticidal activity as compared to parathion.

EXAMPLE 3

Samples of a 50% wettable powder made up according to Example 1 were diluted with water to a toxicant concentration of 0.125, 0.25 and 0.5 pound of active tin compound per 100 gallons of spray respectively.

Tests were carried out to determine the effectiveness of these sprays against McDaniel mites (*Tetranychus medanieli*) on red delicious apple trees. Selected limbs of small trees were sprayed using a $CO_2$-driven one-pint capacity sprayer. All sprays were applied to point of run-off. The results are reported in Table 2.

EXAMPLE 5

In order to determine the phytotoxicity of the trienophyl tin compounds the following tests were conducted. Samples of trienophy tin hydroxide and trineophyl tin chloride made up as in Example 1 to form a 50% wettable powder were diluted with water to a concentration of 1 lb. of toxicant per 100 gallons of spray. The spray was applied to the point of run-off on two limbs of each of the trees of each variety sprayed. The variety sprayed were golden delicious apple, Bartlett pear and Fay Elberta peach. All limbs present had fruit which was immature. The weather was sunny and hot. There was no rainfall during the test period. The trees were examined weekly to determine any phytotoxic responses on either fruit or foliage. After four weeks no injury on any variety of either fruit or foliage had been observed.

TABLE 2

| Toxicant | Rate, lbs./100 gal. | Pre-treatment X | Percent | 3 days X | Percent | 7 days X | Percent | 14 days X | Percent | 21 days X | Percent | 28 days X | Percent |
|---|---|---|---|---|---|---|---|---|---|---|---|---|---|
| (Neophyl)₃SnOH* | 0.125 | 11.7 | | 8.5 | 72 | 9.7 | 44 | 10.5 | 86 | 5.7 | 89 | 0.2 | 93 |
| | 0.25 | 3.5 | | 17.2 | 42 | 5.3 | 70 | 8.5 | 89 | 3.2 | 94 | 2.0 | 33 |
| | 0.5 | 16.8 | | 20.7 | 31 | 8.2 | 53 | 7.7 | 90 | 1.0 | 98 | 0.0 | 100 |
| (Neophyl)₃SnCl | 0.125 | 14.2 | | 24.8 | 17 | 13.0 | 25 | 46.5 | 40 | 44.8 | 16 | 5.2 | |
| | 0.25 | 13.7 | | 25.0 | 16 | 13.8 | 21 | 58.8 | 24 | 27.8 | 48 | 3.2 | |
| | 0.5 | 11.0 | | 18.2 | 39 | 4.7 | 73 | 6.5 | 92 | 2.3 | 96 | 0.2 | 93 |
| Check (untreated) | | 12.3 | | 29.9 | | 17.4 | | 77.1 | | 53.3 | | 3.0 | |

*May be in equilibrium with [(Neophyl)₃Sn]₂O.

The above results show a significant reduction in mite population utilizing the neophyl tin compounds as compared to the untreated check. This is particularly true from 7 to 21 days after application. The data presented after 21 days in this test is not reliable due to the presence of predaceous mites which destroyed the McDaniel mites. It is significant, however, to note that while the population of McDaniel mites was being reduced by the neophyl tin compounds, the population of predaceous mites became sufficiently large to aid in the McDaniel mite destruction.

EXAMPLE 4

Tests utilizing samples diluted as in Example 3 were carried out to determine the effectiveness of trineophyl tin toxicants against the European red mite on red June apple trees. All materials were applied by a $CO_2$-driven, five-gallon sprayer. The sprays were applied to the point of run off. The results were as follows:

EXAMPLE 6

The necessity for having alkyl substitution on the carbon atom adjacent to the phenyl group for miticidal activity is shown in a series of tests carried out using various organo-tin compounds at varying concentrations. Stock solutions were prepared containing 1% w./v. of active ingredient. The first compound in Table 4 was in xylene and the remainder of the compounds were in acetone. All stock solutions were then diluted to the concentrations shown with water containing 0.055% v./v. of a 75/25 v./v. mixture of Atlox 3403 and Atlox 3404 (blends of polyoxyethylene derivatives with alkyl aryl sulfonates). The dilute formulations were applied as a spray to bean plants which were infested 24 hours prior to spraying with normal (susceptible) mites (*T. urticae*). On 1, 4 and 8 days after application, the treated leaves were checked for mites and compared with an untreated

TABLE 3

| Toxicant | Rate, lbs./100 gal. | Pretreatment X percent | 4 days X | Percent | 7 days X | Percent |
|---|---|---|---|---|---|---|
| (Neophyl)₃SnOH* | 0.125 | 4.3 | 0.1 | 94 | 0 | 100 |
| | 0.25 | 8.5 | 0 | 100 | 0.1 | 95 |
| | 0.5 | 3.6 | 0.1 | 94 | 0 | 100 |
| (Neophyl)₃SnCl | 0.125 | 5.9 | 1.6 | 0 | 0.6 | 71 |
| | 0.25 | 3.6 | 0.5 | 69 | 0.1 | 95 |
| | 0.5 | 1.8 | 0.7 | 56 | 0.1 | 95 |
| Check (untreated) | | 4.6 | 1.6 | | 2.1 | |

*May be in equilibrium with [(Neophyl)₂Sn]₂O.

check. The percent reduction on mites on the treated leaves as compared with the untreated check were calculated and are reported in Table 4.

TABLE 4

| Toxicant | Percent active w./v. | Percent reduction—days after treatment | | |
|---|---|---|---|---|
| | | 1 day | 4 days | 8 days |
| (Neophyl)₃SnOH* | .12 | 65 | 95 | 99 |
| | .06 | 0 | 83 | 91 |
| | .03 | 67 | 50 | 65 |
| (⌬—CH₂CH₂)₄Sn | .12 | 37 | 49 | 0 |
| | .06 | 25 | 57 | 17 |
| | .03 | 60 | 48 | 45 |
| (⌬—CH₂CH₂)₃SnCl | .12 | 46 | 61 | 12 |
| | .06 | 49 | 47 | 26 |
| | .03 | 49 | 39 | 15 |
| (⌬—CH₂CH₂)₃SnF | .12 | 20 | 20 | 0 |
| | .06 | 32 | 26 | 21 |
| | .03 | 0 | 0 | 20 |

*May be in equilibrium with [(neophyl)₃Sn]₂O.

EXAMPLE 7

The susceptibility of so-called "resistant" mites to the present invention is demonstrated by the following tests.

Bean plants separately infested with Normal (susceptible mites (*T. urticae*), phosphate-resistant mites (*T. pacificus*), and multi-resistant mites (*T. urticae*) were sprayed following the procedure of Example 6. All sprays were applied at 0.015% w./v. concentration. The results are reported in Table 5.

TABLE 5

| | | Percent reduction from check—days after treatment | | | | | |
|---|---|---|---|---|---|---|---|
| | | Normal (*T.u.*) | | P-R (*T.p.*) | | Multi-R (*T.u.*) | |
| | T.I. | 1 | 7 | 1 | 7 | 1 | 7 |
| Toxicant: | | | | | | | |
| (Neophyl)₃SnF | 515 | 67 | 77 | 36 | 96 | 93 | 71 |
| (Neophyl)₃SnCl | 750 | 85 | 90 | 72 | 93 | 94 | 88 |
| (Neophyl)₃SnOH* | 620 | 93 | 91 | 75 | 89 | 94 | 99 |
| (2-phenylpropyl)₃SnF | 130 | 47 | 60 | 51 | 86 | 94 | 95 |
| (2-phenylpropyl)₄Sn | 17 | 57 | 41 | 24 | 46 | 26 | 35 |
| (2-phenylpropyl)₃SnCl | 177 | 45 | 36 | 70 | 66 | 72 | 52 |
| Parathion | 100 | 63 | 37 | 31 | 14 | 31 | 31 |
| (Untreated check reported as mean number of mites/leaf) | | (93) | (313) | (80) | (190) | (54) | (202) |

*May be in equilibrium with [(neophyl)₃Sn]₂O.

These data demonstrate that the organo-tin toxicants are equally as effective against the resistant species of mites as against susceptible ones. In all instances these toxicants were overall more effective than parathion which was used as the standard.

I claim as my invention:

1. A method of controlling mites which comprises contacting the mites with a miticidally effective dosage of a compound of the formula

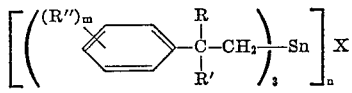

wherein R is lower alkyl, R' and R" are each hydrogen or lower alkyl, m is an integer from 0 to 2, n is an integer of 1 or 2 and X is halogen,

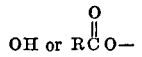

when n is 1 and —O— when n is 2.

2. A method according to claim 1 wherein m is 0, R is methyl and R' is methyl or hydrogen.

3. A method according to claim 2 wherein R' is methyl and X is OH, —O— or an equilibrium mixture of OH and —O—.

4. A method according to claim 2 wherein R' is methyl, n is 1 and X is Cl.

5. A method according to claim 2 wherein R' is methyl, n is 1 and X is F.

6. A method according to claim 2 wherein R' is methyl, n is 1 and X is Br.

7. A method according to claim 2 wherein R' is hydrogen, n is 1 and X is Cl.

8. A method according to claim 2 wherein R' is hydrogen and X is OH or —O—.

9. A miticidal composition comprising a miticidally effective amount of a compound of the formula

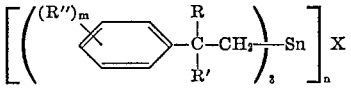

wherein R is lower alkyl, R' and R" are each hydrogen or lower alkyl, m is an integer from 0 to 2, n is an integer of 1 or 2 and X is halogen, $$\text{OH or R}\overset{\text{O}}{\overset{\|}{\text{C}}}\text{O}-$$

when n is 1 and —O— when n is 2 in an inert miticidally acceptable carrier.

References Cited

UNITED STATES PATENTS 3,415,935  12/1968  Friker et al. _____ 424—288 X
3,440,255  4/1969  Matsuda et al. ____ 424—288 X STANLEY J. FRIEDMAN, Primary Examiner
D. R. ORE, Assistant Examiner U.S. Cl. X.R.
260—429.7; 424—170, 171, 357

PO-1050
(5/69)

UNITED STATES PATENT OFFICE
CERTIFICATE OF CORRECTION

Patent No. 3,657,451   Dated April 18, 1972

Inventor(s) CHARLES A. HORNE, JR.

It is certified that error appears in the above-identified patent and that said Letters Patent are hereby corrected as shown below:

In column 2, line 43, change "Organic" to "Inorganic".

Signed and sealed this 3rd day of April 1973.

(SEAL)
Attest:

EDWARD M. FLETCHER, JR.   ROBERT GOTTSCHALK
Attesting Officer         Commissioner of Patents